United States Patent [19]
Solo

[11] 3,991,963
[45] *Nov. 16, 1976

[54] CURTAIN ROD SUPPORT
[75] Inventor: Alan J. Solo, Brooklyn, N.Y.
[73] Assignee: Knock-N-Lok International, Inc., Brooklyn, N.Y.
[ * ] Notice: The portion of the term of this patent subsequent to July 22, 1992, has been disclaimed.
[22] Filed: Jan. 30, 1975
[21] Appl. No.: 545,375

Related U.S. Application Data
[63] Continuation-in-part of Ser. No. 500,537, Aug. 26, 1974, Pat. No. 3,895,773.

[52] U.S. Cl. .............................. 248/262; 248/217
[51] Int. Cl.² ................... E06B 9/00; A47N 5/32; A47H 1/10
[58] Field of Search ........... 248/261, 262, 263, 264, 248/265, 266, 267, 268, 269, 270, 252, 254, 255, 256, 257, 217; 85/5 P, 23

[56] References Cited
UNITED STATES PATENTS

| | | | |
|---|---|---|---|
| 1,049,355 | 1/1913 | Haller | 248/262 |
| 1,288,493 | 12/1918 | Boye | 248/262 X |
| 1,488,258 | 3/1924 | Kirsch | 248/262 |
| 1,631,044 | 5/1927 | Lytton | 85/23 |
| 2,454,894 | 11/1948 | Tatom | 248/261 X |
| 2,564,891 | 8/1951 | Ganter | 248/261 X |
| 3,346,227 | 10/1967 | Hankin | 248/262 |
| 3,895,773 | 7/1975 | Solo | 85/23 |

FOREIGN PATENTS OR APPLICATIONS
500,658  9/1937  United Kingdom ...................... 254/

*Primary Examiner*—J. Franklin Foss
*Attorney, Agent, or Firm*—Friedman, Goodman & Teitelbaum

[57] ABSTRACT

A curtain rod holder includes a relatively flat support member having a hook extending from one side thereof which is configurated to engage and support a curtain rod. An anchor, which may extend through an aperture in the support member or may be integral therewith, extends from the other side of the support member. The anchor includes an elongate shank configurated to be penetrable into a supporting wall and has an axis and a pair of inclined projections which extend from the shank. The projections lock the anchor and prevent relative movement of the latter with respect to the wall when the anchor is driven into the wall and is rotated about the axis thereof to twist the projections about the shank.

11 Claims, 8 Drawing Figures

CURTAIN ROD SUPPORT

CROSS REFERENCE TO RELATED APPLICATION

This application is a continuation-in-part application of application Ser. No. 500,537, filed on Aug. 26, 1974, now Pat. No. 3,895,773.

BACKGROUND OF THE INVENTION

The present invention generally relates to drapery supports, and more specifically to a curtain rod support which includes an anchor which can be driven into a penetrable wall and locked therein by turning of the anchor within the wall.

Numerous drapery supports are known in the art. Most of the known curtain rod supports include a hook for engaging and supporting a curtain rod. However, most of the known drapery supports utilize or cooperate with conventional anchoring means, such as nails, screws or the like, which are driven into the wall for supporting the curtain rod holders.

Frequently, draperies are relatively heavy in weight and substantial stresses are applied to the curtain rod holders, the anchors which maintain the supports attached to the wall, as well as the supporting wall portions into which the anchor is driven. Because curtains are frequently heavy, as are sometimes the curtain rods themselves, it is important that the curtain rod holders and the anchors with which they cooperate can withstand the stresses applied thereto. This is especially important since injury to persons may result upon failure of the curtain rod holder or anchor.

To achieve better attachment of the curtain rod to a wall, resort was frequently made to more sophisticated anchoring devices which, however, required substantial effort and increased expense to mount.

SUMMARY OF THE INVENTION

Accordingly, it is an object of the present invention to provide a curtain rod holder which does not have the above described disadvantages.

It is another object of the present invention to provide a curtain rod holder which is simple in construction and economical to manufacture.

It is still another object of the present invention to provide a curtain rod holder which is integrally formed and molded from a plastic material.

It is yet another object of the present invention to provide a curtain rod holder which can withstand substantial stresses and support substantial heights without failure thereof.

It is a further object of the present invention to provide a curtain rod holder as suggested in the above objects which utilizes an anchor having a shank and elongate projections extending from the shank for increasing the holding power of the anchor within a relatively brittle supporting wall.

It is still a further object of the present invention to provide a curtain rod holder which requires substantially less time for mounting on a wall than do conventional supports.

It is yet a further object of the present invention to provide a curtain rod holder as in the last objects which includes a novel anchor having a shank which can be penetrated into the wall and locked in position by rotation of the shank about the axis thereof.

It is yet a further object of the present invention to provide a curtain rod holder which is of unitary construction and which has an anchor as described in U.S. Pat. application Ser. No. 500,537, filed on Aug. 26, 1974.

It is an additional object of the present invention to provide a curtain rod holder having a planar support member provided with apertures therethrough for receiving headed fasteners of the type disclosed in U.S. patent application Ser. No. 500,537, filed on Aug. 26, 1974.

It is yet an additional object of the present invention to provide a curtain rod holder which is provided with a curtain rod hook on one side of a planar support member and an anchor at the other side of the support member with the anchor being so positioned so that it may be driven into a wall by impacting the anchor along an axis thereof either by hammering the planar support member directly or by hammering the hook.

To achieve the above objects as well as others which become apparent hereafter, the curtain rod in accordance with the present invention comprises a support member and a hook extending from one side of said support member. Said hook is configurated to engage and support a curtain rod. An anchor is provided including an elongate shank having an axis and extending from the other side of said support member. Said shank is configurated to be penetrable into a supporting wall and includes locking means in the form of at least one projection extending from said shank for locking said anchor and for preventing relative movement of the latter with respect to the wall when said anchor has penetrated the wall and is rotated about the axis thereof to twist said at least one projection about said shank.

A presently preferred construction of said anchor is described in U.S. Patent application Ser. No. 500,537, filed on Aug. 26, 1974. The curtain rod holder may be integrally formed and molded from a plastic material to incorporate the support member, hook and anchor. Alternately, the hook can be integrally formed with the support member and a separate anchor may be utilized which passes through an aperture in the support member and cooperates with the latter to fix the position of the curtain rod holder when the anchor is embedded and fixed in the wall.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of the presently preferred embodiments in which.

DESCRIPTION OF THE PREFERRED EMBODIMENTS

Figure 1:
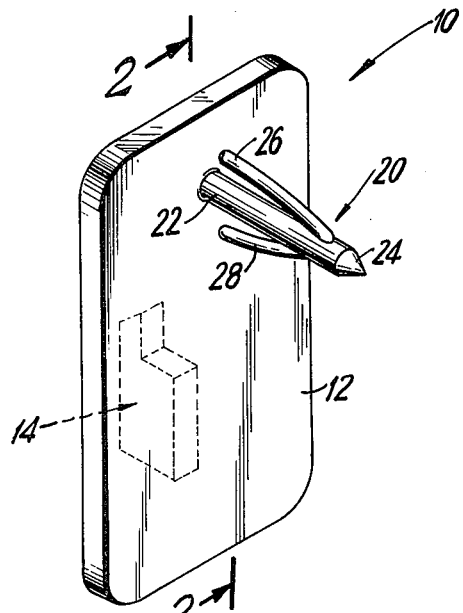
FIG. 1 is a perspective view of a curtain rod support in accordance with the present invention, showing one embodiment of the holder wherein the support member, hook and anchor are integrally molded from a plastic material.
Figure 2:
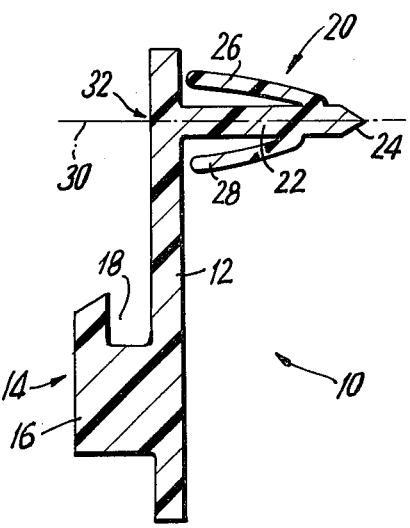
FIG. 2 is a cross section of the anchor shown in FIG. 1, taken along line 2—2.

Referring now to the FIGURES, wherein identical or similar parts are designated by the same reference numerals throughout, and first referring to FIGS. 1 and 2, one embodiment of a curtain rod support or holder in accordance with the present invention is generally designated by the reference numeral 10.

The holder 10 includes a planar support member 12 which may be in the form of a thin flat sheet or section of material as shown. Extending from one side of the member 12 is a hook generally designated by the reference numeral 14 which includes a projection 16 in which there is formed a recess 18. The hook 14 is dimensioned and shaped in a conventional manner to engage and support a curtain rod of the type commonly used for hanging drapes and curtains.

Extending from the other side of the planar member 12 is a fastener or anchor which is generally designated by the reference numeral 20.

The anchor 20 includes a shank 22 having a point 24 at one end thereof. In the embodiment being described, the other end of the shank is integrally formed with the planar member 12.

A pair of elongate projections 26 and 28 extend from the shank 22 in the region of the point 24 and are inclined in the direction of the planar member 12. To facilitate entry of the anchor 20 into a wall surface, as will become clear hereafter, the projections 26 and 28 are attached or extend from axially displaced portions of th shank. In this manner, and particularly with cardboard-covered plasterboard panels, less of a "breakthrough" takes place when the fastener is driven through the plasterboard covering sheets. The construction of the anchor or fastener 20 is the same as that disclosed in U.S. patent application Ser. No. 500,537, filed on Aug. 26, 1974. The detailed descriptions of the anchor 20 in that patent application as hereby incorporated into this application to avoid repetition. While two projections 26, 28 have been shown as extending from the shank 22, it should be clear that only one extension or projection may be sufficient.

The holder 10 is shown to be integrally formed. For example, the holder 10 may be molded from a plastic material such as nylon or "Lexan". It is only important that the projections 26, 28 be made of a flexible and resilient material to permit the same to be deformed and at least partially wrapped about the axial length of the shank 22 when the latter is turned about its axis 30.

While not limited to this application, the fastener or anchor 20, more fully described in the above-mentioned patent application, is particularly suitable for becoming embedded and locked within a brittle-type material such as plasterboard or gypsumboard. In such materials, hammering of the anchor 20 into the penetrable wall results in the wall material flexing the projections 26, 28 to a position substantially coextensive with the shank 22.

Figure 3:
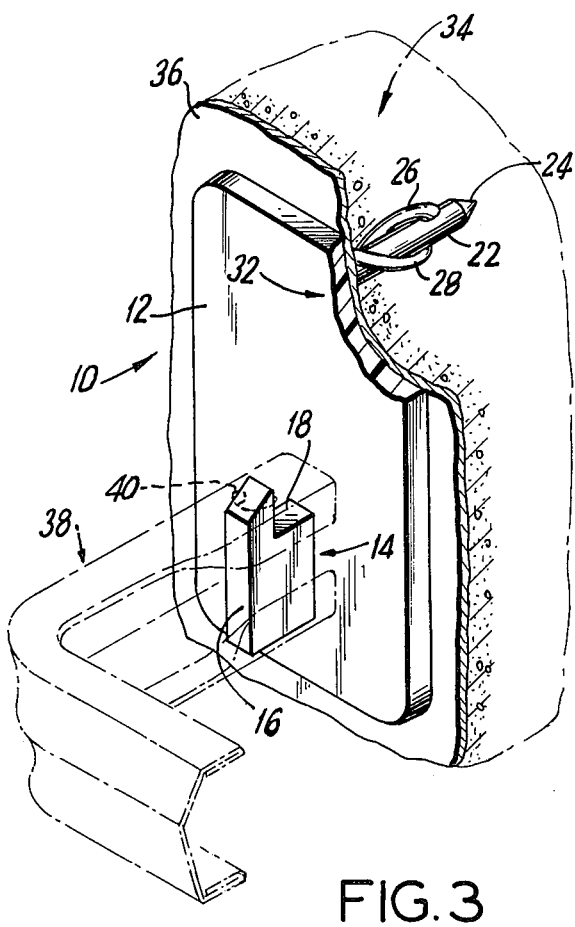
FIG. 3 is a perspective view, partially broken away, showing the anchor of FIGS. 1 and 2 after the anchor is driven into a wall and the curtain rod holder rotated approximately 360° to the orientation shown to lock the anchor within the wall.

Referring to FIG. 3, turning the support member 12, and therefore the shank 22, about the axis 30 causes the projections 26, 28 to flex and become twisted about the shank. The resiliency of the projections 26, 28 causes the same to tend to flare radially outwardly from the axis 30 of the shank 22 to become wedged between the latter and the wall material to thereby secure the anchor 30 and the support member 12 in place and resist the same from becoming separated from the wall.

According to one feature of the curtain rod holder 10, the hook 14 projects from a portion of the planar member 12 along the plane of the latter remote from the portion along the support member 12 from which the anchor 20 projects. This leaves an exposed surface portion 32 on the same side from which the portion hook projects. The surface portion is in opposition to the shank 22 and along the line of the shank axis 30. The surface portion 32 serves as a hammering or impacting area whereby the anchor 20 may be driven into a wall by impacting the surface portion 32 and thereby effectively impacting the shank along the axis thereof into the wall.

The manner in which the anchor 10 is mounted on a wall will now be described. Referring to FIG. 3, a section of plaster wall board or gypsumboard 34 is shown as comprising a layer of plaster or gypsum covered with a cardboard or other similar sheet of material 36. When the shank 22 is of a relatively small diameter, the curtain rod holder 10 may be hammered into the wall material by hammering or impacting the portion 32 as suggested above. However, it is also possible to drill a pilot hole in the wall 34 which is slightly smaller in diameter than the diameter of the shank 22 to facilitate entry of the anchor into the wall 34 and to minimize the deterioration of the wall material which may result from excessive hammering.

The anchor 20 is initially advanced into the wall material with the hook in an upside down orientation, namely with the recess 18 opening facing downwardly. After the anchor 20 has fully penetrated the wall, the planar surface from which the shank 22 extends is brought into abutment against the covering sheet 36, this providing support for rotation of the holder 10 about the axis 30 of the shank.

As shown in FIG. 3, rotation of the holder 10 is through 360° to bring the hook 14 back to its original orientation. In this position, a conventional curtain 38 having a hole 40 may be engaged with and mounted on the hook 14. While a suitable degree of rotation from the initial penetrated position to the final anchored position shown in FIG. 3 is approximately 360°, this is not a critical feature of the present invention. Any suitable degree of rotation up to 360° is possible. However, excessive rotation about the shank 30 may cause excessive deterioration of the material in the region of the anchor 30, this decreasing the holding power of the anchor within the wall. On the other hand, it is important to rotate the anchor sufficiently about the axis thereof to provide for the above-mentioned twisting of the projections about the shank, as more fully described in the above-mentioned application.

Figure 4:
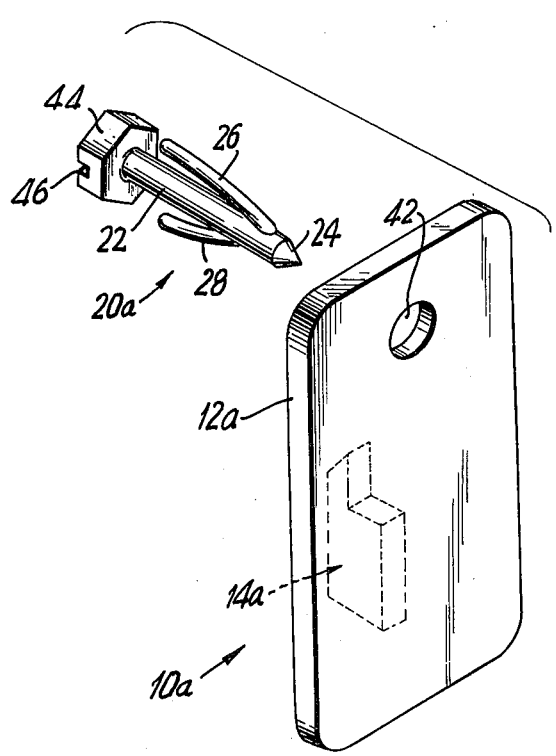
FIG. 4 is a perspective view of another embodiment of the present invention wherein the anchor is not integrally formed with the support member but includes a shank which can pass through an aperture of the latter and a head which abuts against and maintains the support member fixed to a wall.

In FIG. 4, a second embodiment 10a is shown which is similar in construction to the curtain rod holder 10 with the exception that the anchor 10 is not integrally formed with the rest of the holder. Thus, the hook 14a extends from the planar member 12a as above described. However, instead of being integrally formed with the planar member 12a, the anchor 20a is distinct or separable from the support member 12a as shown. The anchor 20a is similar to the fastener described in U.S. application Ser. No. 500,537.

The curtain rod holder 10a is provided with a hole 42 in the region where the fastener 20 of the first embodiment extended. The fastener or anchor 20a is similarly formed as is the fastener 20 with the exception that the end of the shank which is opposite to the pointed end is provided a head 44 formed with a transverse slot 46. The head is advantageously hexagonal in configuration and may be engaged either with a suitable wrench or a screwdriver the point of which may be received within the slot 46.

In the use of the embodiment 10a, the planr member 12a is placed in abutment against the wall on which it is to be mounted in the desired orientation. The pointed end 24 of the fastener 20a is passed through the hole 42 and the fastener or anchor is hammered or otherwise driven into the wall. Once fully penetrated, with the head 44 in abutment against the planar member 12a, the head is engaged as suggested above and rotated the required amount to cause the projections 26 and 28 to become twisted about the shank 22 as above described. Again, the degree of rotation of the head 44 is not critical. A degree of rotation which has been found to be satisfactory is in the range between approximately 180° and 360°, with 180° being found to provide satisfactory results.

Figure 5:
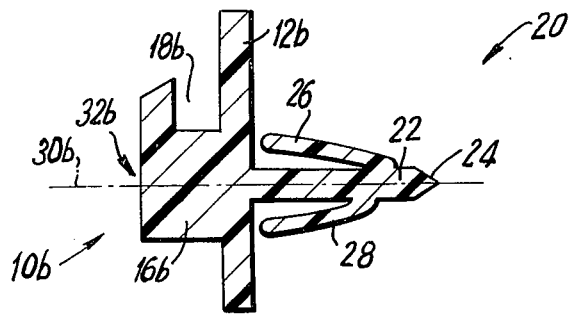
FIG. 5 is a cross section of still another embodiment in accordance with the present invention wherein the hook is provided with a frontal surface and the hook is aligned along the axis of the shank to permit hammering of the curtain rod holder into a wall by hammering the frontal surface of the hook.

In FIG. 5, a further embodiment 20b of the fastener is shown, wherein the hook 16b is provided with a frontal surface 32b which is normal to the axis 30b of the shank 22, and the hook 16b is aligned with the anchor 20, on the oppiste side of the support member 12b. Here, the anchor 20 can be driven into a wall by impacting the frontal hook surface 32b. This is as distinguished from the curtain rod holder 10 shown in FIGS. 1–3, wherein the hook 14 and the anchor 20 are displaced along the planar member 12 to provide a distinct or separate hammering or impacting surface portion 32 whereby the shank 22 can be hammered into a wall along the axis thereof. In other respects, the embodiments 10 and 10b are similar in that they are both integrally formed and may be molded from a plastic material which has sufficient strength and yet has the requisite flexibility and resiliency as described in the above-mentioned patent application. For example, plastic materials such as nylon and "Lexan" have been found to be suitable for this application.

Figure 6:
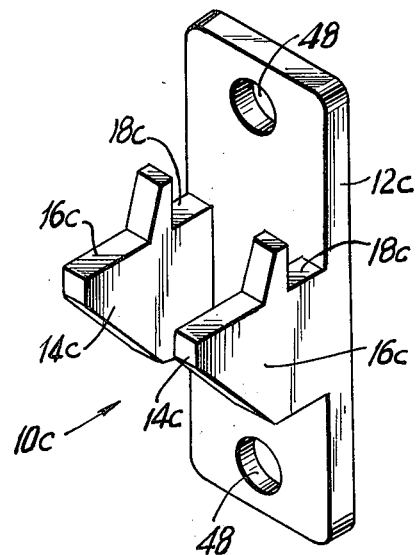
FIG. 6 is a perspetive view of yet another embodiment of the present invention, wherein the support member is provided with two apertures for receiving two anchors of the type shown in FIG. 4 and provided with two spaced curtain rod hooks for engaging and supporting twin curtain rods.

The curtain rod holder 10c shown in FIG. 6 is similar to the curtain rod holder 10a shown in FIG. 4. However, the planar member 12c is provided with a pair of holes or apertures 48, one above the hooks and one below, each dimensioned for receiving an anchor 20a shown in FIG. 4. Additionally, the holder 10c is provided with a pair of spaced parallel hooks 16c each of which extends from the same side of the support member 12c. The hooks 16c are similarly configurated and are adapted to engage and support twin curtain rods.

The hooks which have been described in connection with FIGS. 1–6 are suitable for supporting drapery-type curtain rod holders. The next two embodiments to be described are suitable for supporting cafe-type curtain rods. However, the same principles of construction and mounting of the holders on the wall surface apply. Thus, in FIG. 7, a curtain rod holder 10d is shown which includes a support member in the nature of a relatively thin planar sheet or rear portion 50a. The hook for the cafe-type curtain rod is in the form of a continuation of the lower end of the rear portion 50a which bends, at 50c, to form a frontal portion 50b which is spaced from a substantially parallel to the rear portion 50a. The rear and front portions 50a, 50b together form a space therebetween which is suitable for receiving the curtain rod 52, as shown in dashed outline. Cafe-type curtain rods 52 generally include globes or balls 54 as the ends thereof to prevent excessive sliding of the curtain rods when supported on the holders and to prevent separation therebetween.

Figure 7:
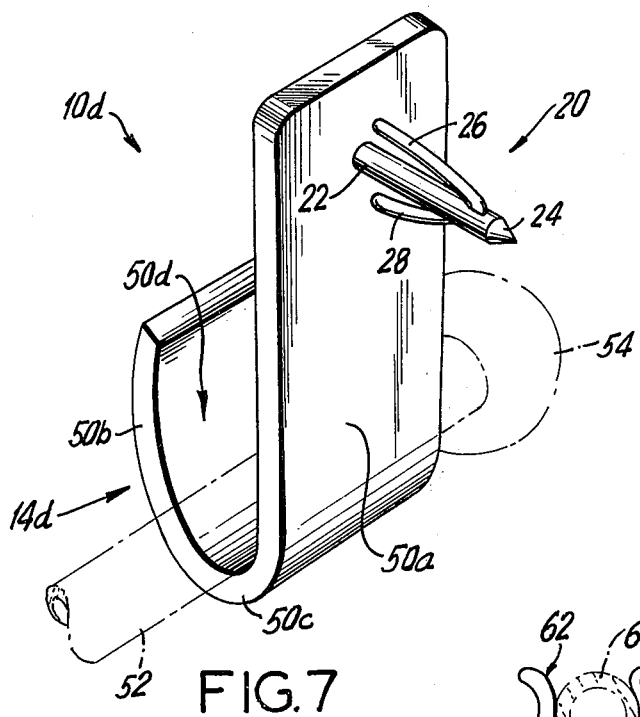
FIG. 7 is a perspective view of a further embodiment of the curtain rod holder of the present invention, showing the support member bent at the lower end thereof and including an upwardly directed extension to form a hook suitable for receiving a cafe-type curtain rod.
Figure 8:
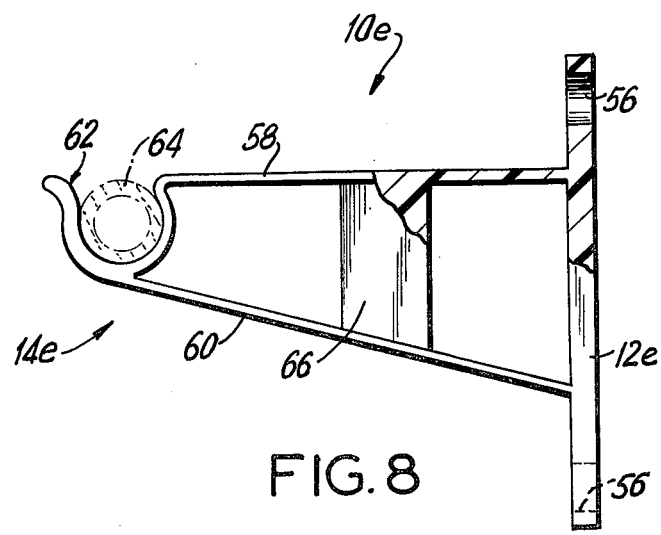
FIG. 8 is an additional embodiment of a curtain rod holder of the present invention for a cafe-type curtain rod which utilizes separate fasteners or anchors of the type shown in FIG. 4.

Referring to FIG. 7, a still further embodiment 10e is shown which, as the other embodiments, includes a planar support member 12e. The support member 12e has upper and lower apertures or holes 56 similar to those shown in FIG. 6. However, to make the holder suitable for supporting a cafe-type curtain rod, the holder 10e is provided with an upper, substantially horizontal support member 58 and a lower support member 60. The support members 58 and 60 generally converge towards each other as shown. The hook in this embodiment comprises a cradle 62 which is connected to the upper and lower support members at the converged free ends thereof. The cradle 62 is configurated and dimensioned to receive a cafe-type curtain rod 64.

Advantageously, the curtain rod holder 10e is provided with reenforcing means in the form of a cross member 66 which extends between the upper and lower support members 58 and 60 to prevent deformation of the same during support of the curtain rod and curtains. This is particularly important when the holder is integrally formed and molded from a plastic material which may be subject to deformation under stress.

The above embodiments have merely illustrated some possible applications of the present invention. In each case, there is provided the planar support member from which a curtain rod supporting hook projects. An anchor is provided, either integrally formed or adapted to pass through the support member, for penetrating a wall material and for securing the support member to the wall upon a turning action of the support member or of the head of the anchor about the axis of the shank thereof. The above-described examples are not intended to limit the present invention. Additionally, in all the embodiments shown where the anchor is integrally formed with the support member, it should be clear that a suitable aperture in the support member may be formed through which a separate anchor 20a such as shown in FIG. 4 may be driven. Conversely, in those embodiments where apertures are shown in the support members for use with separate anchors, it is equally possible to integrally form the anchors with the support member at the aperture locations.

The advantages of the present curtain rod holders are numerous. In addition to their simple and economical construction, these anchors may be securely mounted on walls, including plaster or gypsum wall boards, to mount a curtain rod and curtains with a minimum effort or expansion of time.

Numerous alterations of the structure herein disclosed will suggest themselves to those skilled in the art. However, it is to be understood that the present disclosure relates to preferred embodiments of the invention which are for purposes of illustration only and are not to be construed as limiting the invention.

What is claimed is:

1. A curtain rod holder and like holders comprising a support member; a hook extending from said support member and configurated to engage and support a curtain rod; and anchor means for maintaining said support member mounted on relatively brittle penetrable wall, said anchor means including an elongate shank, said shank having one end thereof pointed and suitable for being driven into a penetrable wall, the other end of said shank cooperating with said support member and being suitable for being hammered to advance the pointed end of said shank through the penetrable wall and for being engaged to permit turning of said shank about the axis thereof, at least one projection extending from said shank proximate to the pointed end and inclined relative to said shank in the direction of said head, said projection being integrally formed with said shank and being flexible and resilient to permit the same to be deformed and at least partially wrapped about the axial length of said shank whereby hammering said anchor means into a penetrable wall causes the wall material to flex said projection to a position substantially coextensive with said shank, and turning of said shank about the axis thereof, causes said projection to flex and become twisted about said shank, the resiliency of said projection causing the same to tend to flare radially outwardlay from the axis of said shank to become wedged between the latter and the wall material to thereby secure said anchor means and said support member and place and resist the same from becoming removed from the wall.

2. A curtain rod holder as defined in claim 1, wherein said support member has a substantially planar surface at one side thereof, which surface is normal to said axis, whereby said support member planar surface may be brought into abutment against the wall to provide support during turning of the anchor once said shank has fully penetrated the wall.

3. A curtain rod holder as defined in claim 1, wherein said support member, hook and anchor means are integrally formed.

4. A curtain rod holder as defined in claim 3, wherein said support member is in the form of a thin section of planar material, said hook projecting from a portion of said section remote from a portion along said section from which said anchor means projects to thereby leave exposed a surface portion on one side which is in opposition to said shank and along the line of said axis, said surface portion serving as a hammering or impacting area, whereby said anchor means may be driven into the wall by impacting said surface portion and effectively impacting said shank along the axis thereof into the wall.

5. A curtain rod holder as defined in claim 1, wherein said support member is provided with an aperture therethrough, and said shank being dimensioned to pass through said aperture prior to penetration into the wall and including engaging means for engaging said support member and maintaining the latter in abutment against the wall once said projection is twisted about said shank and said anchor means is located within the wall.

6. A curtain rod holder as defined in claim 5, wherein said engaging means includes an engageable head at the other end of said shank suitable for engaging said support member and for being hammered to advance the pointed end of said shank through the penetrable wall and for being engaged to permit turning of said shank about the axis thereof.

7. A curtain rod holder as defined in claim 1, wherein said support member is in the nature of a relatively thin planar sheet and said hook comprises a continuation of said support member at one end thereof which bends to form a portion which is spaced from and substantially parallel to said planar sheet to form a space therebetween which is suitable for receiving a cafe-type curtain rod.

8. A curtain rod holder as defined in claim 1, wherein said hook is provided with a frontal surface portion which is normal to said axis and said hook is aligned to said anchor means along said axis, whereby said anchor means may be driven into the wall by impacting said frontal hook surface.

9. A curtain rod holder as defined in claim 1, wherein a apir of hooks extend from one side of said support member, said hooks being similarly configurated and adapted to engage and support twin curtain rods.

10. A curtain rod holder as defined in claim 1, wherein upper and lower spaced members project from said support member and generally converge towards each other, said hook comprising a cradle connected to said upper and lower members at the converged free ends thereof which is configurated to receive a cafe-type curtain rod.

11. A curtain rod holder as defined in claim 1, further comprising reenforcing means extending between said upper and lower members to prevent deformation of the same during support of the curtain rod and curtains.

* * * * *